United States Patent
Zink et al.

(10) Patent No.: US 11,118,664 B2
(45) Date of Patent: Sep. 14, 2021

(54) LIMITED SLIP DIFFERENTIAL WITH CLUTCH FOR INHIBITING SPEED DIFFERENTIATION BETWEEN SIDE GEARS

(71) Applicant: AMERICAN AXLE & MANUFACTURING, INC., Detroit, MI (US)

(72) Inventors: Frederick E. Zink, Capac, MI (US); Joshua A. Kirby, Sterling Heights, MI (US); Joseph S. Balenda, II, Grand Blanc, MI (US); Michael Schulte, Sylvania, OH (US)

(73) Assignee: American Axle & Manufacturing, Inc., Detroit, MI (US)

(*) Notice: Subject to any disclaimer, the term of this patent is extended or adjusted under 35 U.S.C. 154(b) by 182 days.

(21) Appl. No.: 16/600,671

(22) Filed: Oct. 14, 2019

(65) Prior Publication Data

US 2020/0141476 A1   May 7, 2020

Related U.S. Application Data

(60) Provisional application No. 62/756,091, filed on Nov. 6, 2018.

(51) Int. Cl.
*F16H 48/22* (2006.01)
*F16H 48/24* (2006.01)
*F16H 48/08* (2006.01)

(52) U.S. Cl.
CPC ............. *F16H 48/22* (2013.01); *F16H 48/24* (2013.01); *F16H 48/08* (2013.01)

(58) Field of Classification Search
CPC ................................. F16H 48/22; F16H 48/24
See application file for complete search history.

(56) References Cited

U.S. PATENT DOCUMENTS

| 3,893,351 | A | * | 7/1975 | Baremor | F16H 48/22 475/232 |
|---|---|---|---|---|---|
| 4,389,909 | A | * | 6/1983 | Goscenski, Jr. | F16H 48/08 475/231 |
| 5,484,347 | A | * | 1/1996 | Holmquist | F16H 48/08 192/107 M |
| 6,083,134 | A | * | 7/2000 | Godlew | F16H 48/08 475/150 |
| 6,537,172 | B1 | * | 3/2003 | McAuliffe, Jr. | F16H 48/30 475/150 |
| 6,561,939 | B1 | * | 5/2003 | Knapke | F16D 28/00 192/84.6 |

(Continued)

*Primary Examiner* — David R Morris
(74) *Attorney, Agent, or Firm* — Burris Law, PLLC

(57) ABSTRACT

A differential assembly that includes a differential input member, a differential gear set, a first clutch, and a second clutch. The differential input member is rotatable about a differential axis and defines an internal cavity. The differential gear set is received in the differential cavity and includes first and second side gears. The first clutch has a plurality of first clutch plates and a plurality of second clutch plates. The first clutch plates are rotatably coupled to the differential input member. The second clutch plates are interleaved with the first clutch plates and are rotatably coupled to the first side gear. The second clutch is selectively operable to non-rotatably couple one of the first and second side gears to the differential input member.

9 Claims, 2 Drawing Sheets

(56) References Cited

U.S. PATENT DOCUMENTS

Figure 1:
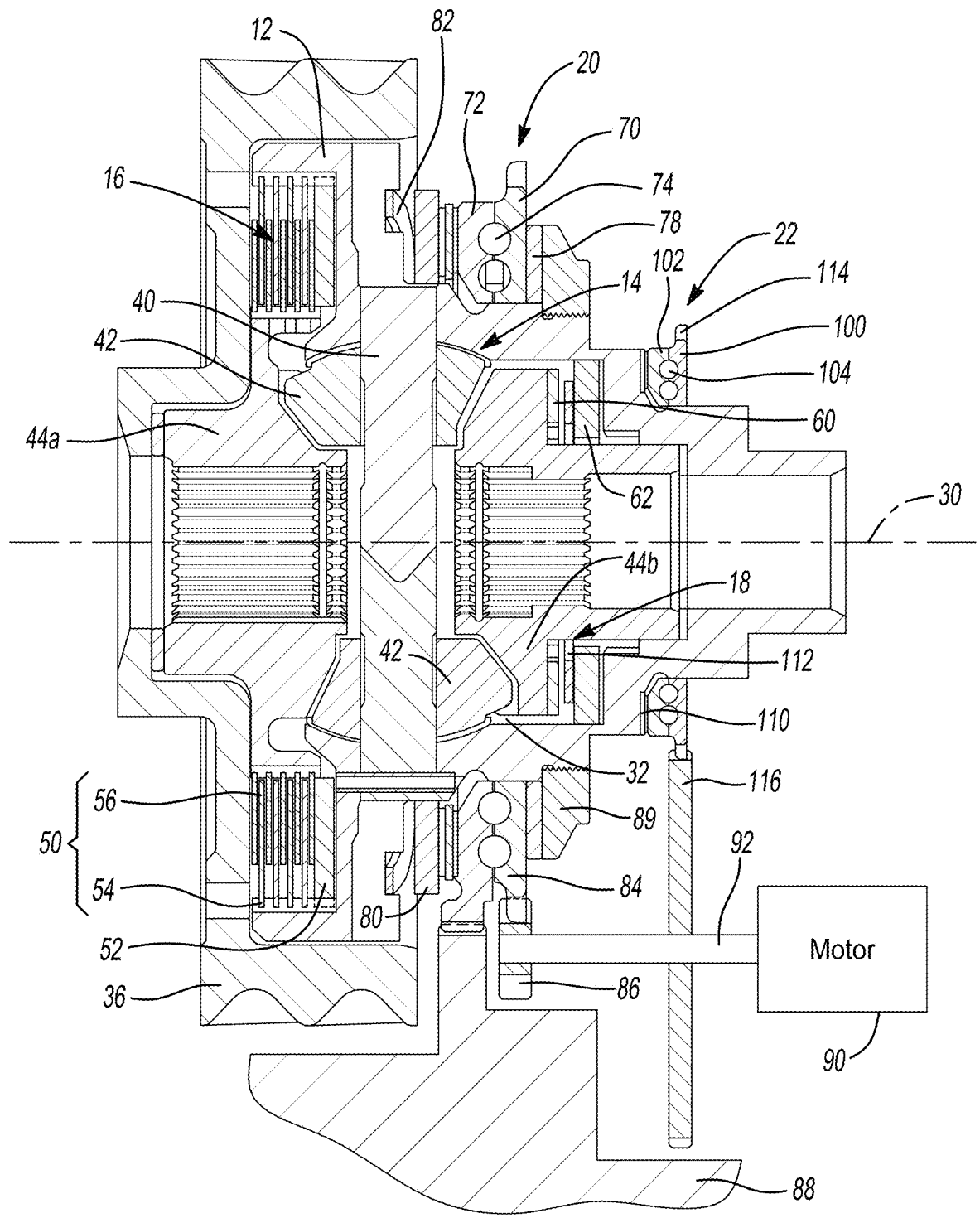

| | | | |
|---|---|---|---|
| 2001/0044355 A1* | 11/2001 | Cheadle | F16H 48/24 475/150 |
| 2005/0047912 A1 | 3/2005 | Giesler et al. | |
| 2007/0191174 A1* | 8/2007 | Kyle | F16H 48/22 475/231 |
| 2008/0023177 A1 | 1/2008 | Hassett et al. | |
| 2008/0058151 A1* | 3/2008 | Curtis | F16H 48/22 475/232 |
| 2008/0254931 A1* | 10/2008 | Sugaya | F16H 48/24 475/238 |
| 2014/0368064 A1 | 12/2014 | Fedoseyev et al. | |
| 2017/0198798 A1* | 7/2017 | Ziech | F16D 13/70 |
| 2019/0203818 A1 | 7/2019 | Broker et al. | |

* cited by examiner

LIMITED SLIP DIFFERENTIAL WITH CLUTCH FOR INHIBITING SPEED DIFFERENTIATION BETWEEN SIDE GEARS

CROSS-REFERENCE TO RELATED APPLICATIONS

This application claims the benefit of U.S. Provisional Application No. 62/756,091 filed Nov. 6, 2019, the disclosure of which is incorporated by reference as if fully set forth in detail below.

FIELD

The present disclosure relates to a limited slip differential having a clutch for selectively inhibiting speed differentiation between a pair of side gears.

BACKGROUND

This section provides background information related to the present disclosure which is not necessarily prior art.

Limited slip differentials are employed to limit speed differentiation between the side gears of a differential gear set under certain situations. Typically, a limited slip differential will include one or more friction clutches or clutch packs, with each clutch pack providing a torque-carrying interface between a differential case and one of the side gears. A spring can be employed to pre-load the clutch pack to provide a desired torque-carrying capacity. Optionally, a cam mechanism can be incorporated into the limited slip differential that can increase the load on the clutch pack(s) in relation to the magnitude of the torque that is transmitted through the limited slip differential to thereby increase the torque-carrying capacity of the interface(s). Modernly, electronically controlled actuators have been incorporated into limited slip differentials that permit the compressive force on the clutch pack(s) to be varied and thereby vary the torque-carrying capacity of the clutch pack(s). In some configurations, sufficient compressive force can be applied by the electronically controlled actuator to essentially lock the differential gear set (i.e., inhibit speed differentiation between the side gears). While such configurations are satisfactory for their intended purposes, the clutch pack(s) can have relatively high lubrication requirements when they are so heavily loaded.

SUMMARY

This section provides a general summary of the disclosure, and is not a comprehensive disclosure of its full scope or all of its features.

In one form, the present disclosure provides a differential assembly that includes a differential input member, a differential gear set, a first clutch, and a second clutch. The differential input member is rotatable about a differential axis and defines an internal cavity. The differential gear set is received in the differential cavity and includes first and second side gears. The first clutch has a plurality of first clutch plates and a plurality of second clutch plates. The first clutch plates are rotatably coupled to the differential input member. The second clutch plates are interleaved with the first clutch plates and are rotatably coupled to the first side gear. The second clutch is selectively operable to non-rotatably couple one of the first and second side gears to the differential input member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
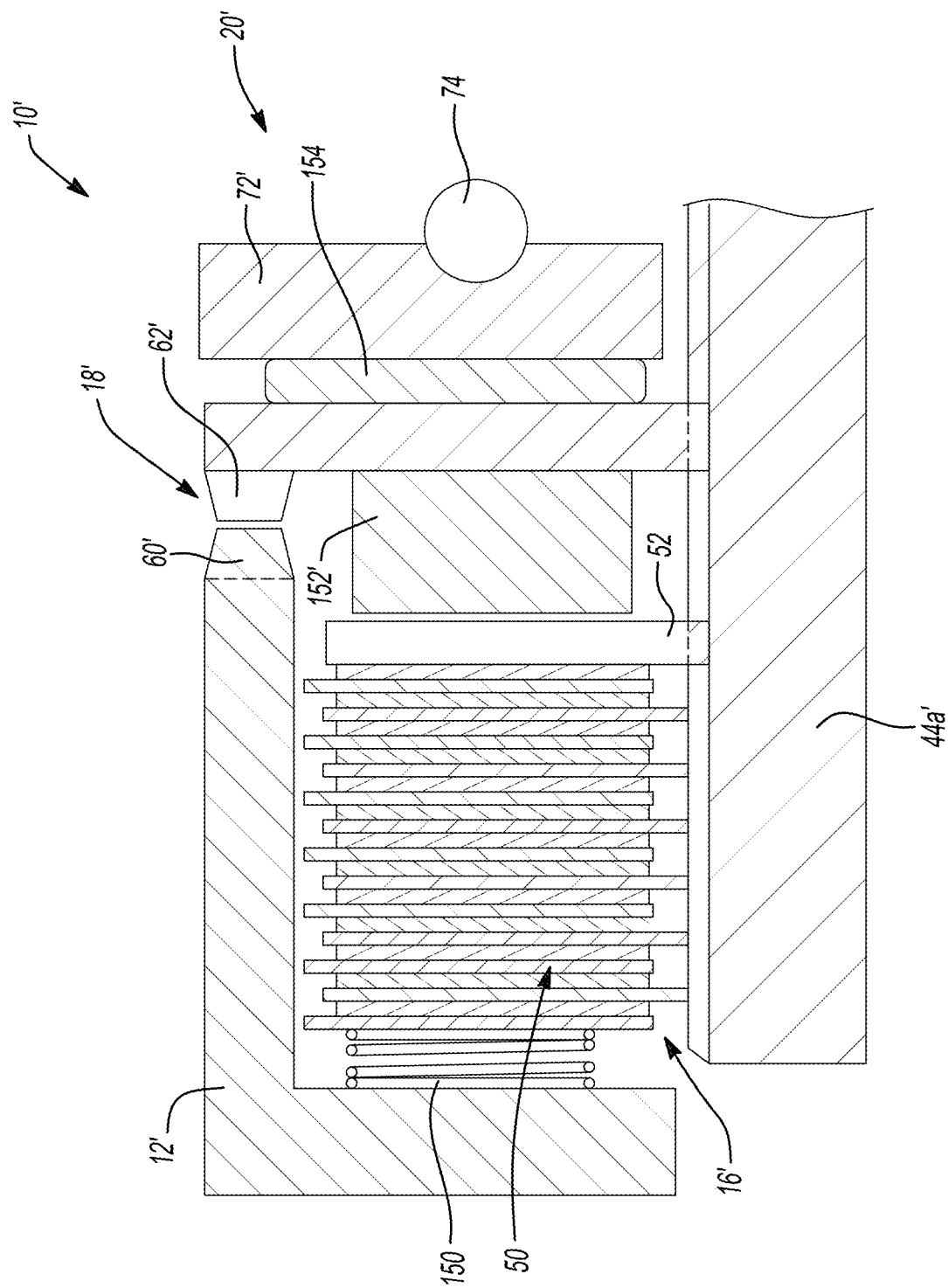

FIG. 1 is a cross-sectional view of a first differential assembly constructed in accordance with the teachings of the present disclosure; and FIG. 2 is a section view of a portion of a second differential assembly constructed in accordance with the teachings of the present disclosure.

Corresponding reference numerals indicate corresponding parts throughout the several views of the drawings.

DETAILED DESCRIPTION

With reference to FIG. 1 of the drawings, an exemplary electronic limited slip differential assembly constructed in accordance with the teachings of the present disclosure is generally indicated by reference numeral 10. The differential assembly 10 can include an input member 12, a differential gear set 14, a first clutch 16, a second clutch 18, a first actuator 20 and a second actuator 22. The input member 12, which is configured to rotate about a differential axis 30, can be a differential case that can define an internal cavity 32 into which the differential gear set 14 and the first clutch 16 can be received. The input member 12 is shown in operative association with a gear 36, which happens to be a helical gear in the example provided, that is fixedly coupled to the input member 12 for common rotation. It will be appreciated that the gear 36 could be configured differently, for example as a type of bevel gear (e.g., straight bevel gear, helical bevel gear, hypoid gear).

The differential gear set 14 can include a cross-pin 40, a plurality of differential pinions 42, and a pair of side gears 44a and 44b. The cross-pin 40 can be mounted to the input member 12 perpendicular to the differential axis 30 so as to extend through the internal cavity 32. Each of the differential pinions 42 can be received in the internal cavity 32 and rotatably disposed on the cross-pin 40. Each of the side gears 44a and 44b can be received in the internal cavity 32 and can be meshingly engaged with the differential pinions 42.

The first clutch 16 can be a friction clutch having a clutch pack 50 and an apply plate 52. The clutch pack 50 can include a plurality of first clutch plates 54 and a plurality of second clutch plates 56. The first clutch plates 54 can be axially slidably but non-rotatably coupled to the input member 12, while the second clutch plates 56 can be interleaved with the first clutch plates 54 and axially slidably but non-rotatably coupled to one of the side gears 44a and 44b. In the example provided, the first clutch plates 54 have an externally-splined circumference that is received into an internally-splined aperture in the input member 12, and the second clutch plates 56 have an internally-splined aperture that is received onto an externally-splined hub on the side gear 44a. The apply plate 52 can abut the clutch pack 50 and can be translated along the differential axis 30 to apply a compressive force to the clutch pack 50. In the example provided, the apply plate 52 has a externally-splined circumference that is engaged to the internally-splined bore in the input member 12.

The second clutch 18 can be a dog clutch having a first dog member 60, which is fixedly coupled to one of the side gears 44a and 44b, and a second dog member 62 that is non-rotatably but axially slidably coupled to the input member 12. In the example provided, the first dog member 60 comprises a plurality of face teeth, which are disposed on an end of the side gear 44b that is opposite the side that engages the differential pinions 42, and the second dog member 62 comprises a plurality of mating face teeth that can be selectively translated along the differential axis 30 into and out of engagement with the face teeth on the side gear 44b.

The first actuator 20 is configured to selectively translate the apply plate 52 along the differential axis 30 and could comprise any type of actuator, such as a hydraulic cylinder. In the example provided, the first actuator 20 comprises a first ball-ramp ring 70, a second ball-ramp ring 72, a plurality of first balls 74, a plurality of first thrust elements (not specifically shown), a first thrust bearing 78, a second thrust bearing 80, a first return spring 82, a first driven gear 84 and a first drive gear 86. The first and second ball-ramp rings 70 and 72 can be received on a first mounting hub on the input member 12 such that the input member 12 is rotatable about the differential axis 30 relative to the first and second ball-ramp rings 70 and 72. The first ball-ramp ring 70 can be mounted to a structure, such as a housing 88 into which the differential assembly 10 is received, so as to be fixed axially along but rotatable about the differential axis 30. The second ball-ramp ring 72 can be mounted to the structure (e.g., housing 88) so as to be non-rotatably but axially movable along the differential axis 30. Faces of the first and second ball-ramp rings 70 and 72 can define a plurality of first and second ball ramps (not specifically shown) that can taper in a circumferential direction (i.e., each of the first and second ball ramps can have a first end and a second end that is spaced circumferentially apart from the first end, and at least a portion of each of the first and second ball ramps can become progressively shallower as the first ball ramp or the second ball ramp is traversed from the first end toward the second end).

Each of the first balls 74 can be received into a corresponding pair of the first and second ball ramps. In this regard, the first and second ball-ramp rings 70 and 72 and the first balls 74 cooperate to form a first ball-ramp actuator in which rotation of the first ball-ramp ring 70 in a first rotational direction about the differential axis 30 from a first rotational position to a second rotational position causes corresponding translation of the second ball-ramp ring 72 along the differential axis 30 from a first axial position to a second axial position in which the second ball-ramp ring 72 is spaced further apart from the first ball-ramp ring 70 than when the second ball-ramp ring 72 is disposed in the first axial position.

The first thrust bearing 78 can be disposed about the input member 12 and can be located on a side of the first ball-ramp ring 70 that is opposite the second ball-ramp ring 72. A nut 89 can be threaded onto a threaded portion of the input member 12 and can abut the first thrust bearing 78 on a side opposite the first ball-ramp ring 70.

The second thrust bearing 80 can be disposed about the input member 12 and can be located on a side of the second ball-ramp ring 72 that is opposite the first ball-ramp ring 70.

The first return spring 82 is configured to urge the second ball-ramp ring 72 toward the first axial position and can be disposed axially between the input member 12 and the second thrust bearing 80. In the example provided, the first return spring 82 is a wave spring, but it will be appreciated that the first return spring 82 could comprise one or more different springs, such as helical coil compression springs.

The first thrust elements can be spaced apart from one another about the differential axis 30 and can extend through holes (not specifically shown) in the input member 12 between the second thrust bearing 80 and the apply plate 52. In the example provided, each of the first thrust elements comprises a pin, but it will be appreciated that each of the first thrust elements could be formed of multiple components, such as a pin and one or more balls, or a plurality of balls.

The first driven gear 84 can be rotatably coupled to the first ball-ramp ring 70. In the example provided, the first driven gear 84 is a sector gear that is unitarily and integrally formed with the first ball-ramp ring 70. The first drive gear 86 is meshingly engaged to the first driven gear 84 and can be driven, either directly or indirectly, via an electric motor 90. In the example provided, the first drive gear 86 is rotatably coupled to an output shaft 92 of the electric motor 90 and as such, is directly driven by the electric motor 90.

The second actuator 22 is configured to selectively translate the second dog member 62 along the differential axis 30 and could comprise any type of actuator, such as a solenoid. In the example provided, the second actuator 22 comprises a third ball-ramp ring 100, a fourth ball-ramp ring 102, a plurality of second balls 104, a plurality of second thrust elements (not specifically shown), a third thrust bearing (not shown), a fourth thrust bearing 110, a second return spring 112, a second driven gear 114 and a second drive gear 116. The third and fourth ball-ramp rings 100 and 102 can be received on a second mounting hub on the input member 12 such that the input member 12 is rotatable about the differential axis 30 relative to the third and fourth ball-ramp rings 100 and 102. The third ball-ramp ring 100 can be mounted to a structure, such as the housing 88, so as to be fixed axially along but rotatable about the differential axis 30. The fourth ball-ramp ring 102 can be mounted to the structure (e.g., the housing 88) so as to be non-rotatably but axially movable along the differential axis 30. Faces of the third and fourth ball-ramp rings 100 and 102 can define a plurality of third and fourth ball ramps (not specifically shown) that can taper in a circumferential direction (i.e., each of the third and fourth ball ramps can have a first end and a second end that is spaced circumferentially apart from the first end, and at least a portion of each of the third and fourth ball ramps can become progressively shallower as the third ball ramp or the fourth ball ramp is traversed from the first end toward the second end).

Each of the second balls 104 can be received into a corresponding pair of the third and fourth ramps. In this regard, the third and fourth ball-ramp rings 100 and 102 and the second balls 104 cooperate to form a second ball-ramp actuator in which rotation of the third ball-ramp ring 100 in a second rotational direction about the differential axis 30 that is opposite the first rotational direction from the first rotational position to a third rotational position causes corresponding translation of the fourth ball-ramp ring 102 along the differential axis 30 from a third axial position to a fourth axial position in which the fourth ball-ramp ring 102 is spaced further apart from the third ball-ramp ring 100 than when the fourth ball-ramp ring 102 is disposed in the third axial position.

The third thrust bearing can be disposed about the input member 12 and can be located on a side of the third ball-ramp ring 100 that is opposite the fourth ball-ramp ring 102. Any desired means, such as a nut or external retaining ring, can be employed to abut the third thrust bearing on a side opposite the third ball-ramp ring 100.

The fourth thrust bearing 110 can be disposed about the input member 12 and can be located on a side of the fourth ball-ramp ring 102 that is opposite the first ball-ramp ring 70.

The second return spring 112 is configured to urge the second dog member 62 away from the first dog member 60 along the differential axis 30. In the example provided, the second return spring 112 is a wave spring that is disposed along the differential axis 30 between the first and second dog members 60 and 62, but it will be appreciated that the second return spring 112 could comprise one or more different springs, such as helical coil compression springs.

The second thrust elements can be spaced apart from one another about the differential axis 30 and can extend through holes (not specifically shown) in the input member 12 between the fourth thrust bearing 110 and the second dog member 62. In the example provided, each of the second thrust elements comprises a pin, but it will be appreciated that each of the second thrust elements could be formed of multiple components, such as a pin and one or more balls, or a plurality of balls.

The second driven gear 114 can be rotatably coupled to the third ball-ramp ring 100. In the example provided, the second driven gear 114 is a sector gear that is unitarily and integrally formed with the third ball-ramp ring 100. The second drive gear 116 is meshingly engaged to the second driven gear 114 and can be driven, either directly or indirectly, via an electric motor. In the example provided, the second drive gear 116 is rotatably coupled to the output shaft 92 of the electric motor 90 and as such, is directly driven by the electric motor 90.

In operation, the first and third ball-ramp rings 70 and 100 can be disposed in the first rotational position to thereby position the second and fourth ball-ramp rings 72 and 102 in the first and third axial positions, respectively. In these position, the first actuator 20 does not apply a force to the apply plate 52 that compresses the clutch pack 50, and the second dog member 62 is disengaged from the first dog member 60. In this condition, the differential assembly 10 can operate as an "open differential".

In situations where it may be desirable to limit speed differentiation between the side gears 44a and 44b, the electric motor 90 can be operated to drive (via the first drive gear 86 and the first driven gear 84) the first ball-ramp ring 70 in the first rotational direction from the first rotational position toward the second rotational position. The second ball-ramp ring 72 can travel in a corresponding manner axially along the differential axis 30 from the first axial position toward the second axial position. Movement of the second ball-ramp ring 72 in this manner correspondingly drives the first thrust elements and the apply plate 52, so that the first and second clutch plates 54 and 56 of the clutch pack 50 are compressed against one another and a compressive force is applied to the clutch pack 50. It will be appreciated that the compressive force applied to the clutch pack 50 can be varied by varying the position of the second ball-ramp ring 72 between the first and second axial positions.

It will be appreciated that operation of the electric motor 90 to drive the first ball-ramp ring 70 in the first rotational direction will correspondingly drive the third ball-ramp ring 100 (via the second drive gear 116 and the second driven gear 114) in the first rotational direction. However, the third and fourth ball-ramps of the third and fourth ball-ramp rings 100 and 102 are configured such that the positioning of the third ball-ramp ring 100 in the second rotational position does not affect the positioning of the fourth ball-ramp ring 102 along the differential axis 30. In this regard, the fourth ball-ramp ring 102 is disposed in the third axial position along the differential axis 30 when the third ball-ramp ring 100 is disposed in the second rotational position.

At times it may be desirable to wholly inhibit speed differentiation between the side gears 44a and 44b. In such instances, the electric motor 90 can be operated to drive (via the second drive gear 116 and the second driven gear 114) the third ball-ramp ring 100 in the second rotational direction from the first rotational position toward the third rotational position. The fourth ball-ramp ring 102 can travel in a corresponding manner axially along the differential axis 30 from the third axial position to the fourth axial position. Movement of the fourth ball-ramp ring 102 in this manner correspondingly drives the second thrust elements and the second dog member 62, so that the second dog member 62 engages the first dog member 60 to thereby inhibit relative rotation between the side gear 44b and the input member 12.

It will be appreciated that operation of the electric motor 90 to drive the third ball-ramp ring 100 in the second rotational direction will correspondingly drive the first ball-ramp ring 70 (via the first drive gear 86 and the first driven gear 84) in the second rotational direction. However, the first and second ball-ramps of the first and second ball-ramp rings 70 and 72 are configured such that the positioning of the first ball-ramp ring 70 in the third rotational position does not affect the positioning of the second ball-ramp ring 72 along the differential axis 30. In this regard, the second ball-ramp ring 72 is disposed in the first axial position along the differential axis 30 when the first ball-ramp ring 70 is disposed in the third rotational position.

A portion of a second differential assembly 10' constructed in accordance with the teachings of the present disclosure is depicted in FIG. 2. In this example, a single ball-ramp actuator 20' is employed to coordinate the operation of the first and second clutches 16' and 18'. More specifically, the first dog member 60' is formed onto or rotationally coupled to the input member 12', the second dog member 62' is non-rotatably but axially slidably coupled to the side gear 44a', a spring 150 is employed between the clutch pack 50 and the input member 12', the first thrust element 152', which consists of an annular spacer, is disposed axially between the second dog member 62' and the apply plate 52, and a single thrust bearing 154 is employed between the second ball-ramp ring 72' and the second dog member 62'. The second ball-ramp ring 72' of the ball-ramp actuator 20' is movable between a first axial position, a second axial position, and a plurality of intermediate positions between the first and second axial positions.

When the second ball-ramp ring 72' is positioned in the first axial position, the second dog member 62' is disengaged from the first dog member 60', the spring 150 is uncompressed to the fullest extent that is permitted in the assembly, and no compressive force is applied to the clutch pack 50 so that the differential assembly 10' operates as an "open differential". The spring 150, which can comprise one or more springs, such as helical coil compression springs, can be pre-compressed between the input member 12' and the clutch pack 50. In this regard, the spring 150 can be disposed in a compressed state between the input member 12' and a retaining ring (not shown) on the input member 12' so that a compressive force in excess of a predetermined threshold is required to (further) compress the spring 150.

When the second ball-ramp ring 72' is positioned in the second axial position, the compressive force exerted on the clutch pack 50 exceeds the predetermined threshold such that the spring 150 further compresses and the second dog member 62' is moved into engagement with the first dog member 60'. In this condition, the engagement of the first and second dog members 60' and 62' with one another inhibits relative rotation between the side gear 44a' and the input member 12'.

When the second ball-ramp ring 72' is positioned in any of the infinite intermediate positions between the first and second positions, a compressive force is exerted on the clutch pack 50 that tends to inhibit relative rotation between the side gear 44a' and the input member 12'. However, the compressive force exerted on the clutch pack 50 does not exceed the predetermined threshold so that the spring 150 is maintained in its pre-compressed state and the second dog member 62' is disengaged from the first dog member 60'.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A differential assembly comprising:
    a differential input member that is rotatable about a differential axis and which defines an internal cavity;
    a differential gear set received in the internal cavity, the differential gearset having first and second side gears;
    a first clutch having an apply plate and a clutch pack, the apply plate being non-rotatably but axially movably coupled to one of the differential input member and the first side gear, the clutch pack having a plurality of first clutch plates and a plurality of second clutch plates, the first clutch plates being rotatably coupled to the differential input member, the second clutch plates being interleaved with the first clutch plates and being rotatably coupled to the first side gear;
    a second clutch that is selectively operable to non-rotatably couple one of the first and second side gears to the differential input member;
    a first actuator that is configured to selectively translate the apply plate along the differential axis to compress the clutch pack to frictionally engage the first and second clutch plates to one another; and
    a second actuator for selectively engaging the second clutch.

2. The differential assembly of claim 1, wherein the first actuator comprises a first ball-ramp actuator that is disposed about the differential input member.

3. The differential assembly of claim 2, wherein the second actuator comprises a second ball-ramp actuator that is disposed about the differential input member.

4. The differential assembly of claim 3, wherein the second clutch is a dog clutch.

5. A differential assembly comprising:
    a differential input member that is rotatable about a differential axis and which defines an internal cavity;
    a differential clear set received in the internal cavity, the differential gearset having first and second side clears;
    a first clutch having a plurality of first clutch plates and a plurality of second clutch plates, the first clutch plates being rotatably coupled to the differential input member, the second clutch plates being interleaved with the first clutch plates and being rotatably coupled to the first side gear;
    a second clutch that is selectively operable to non-rotatably couple one of the first and second side gears to the differential input member;
    a first ball-ramp actuator disposed about the differential input member, the first ball-ramp actuator being selectively operable to vary a compressive force exerted on the first and second clutch plates; and
    a second ball-ramp actuator disposed about the differential input member, the second ball-ramp actuator being selectively operable at least one of engage and disengage the second clutch;
    wherein the first and second ball-ramp actuators are operated by a common rotary electric motor.

6. The differential assembly of claim 5, wherein the common rotary electric motor has an output shaft, wherein the first ball-ramp actuator has first and second ball-ramp rings, wherein the second ball-ramp actuator has third and fourth ball-ramp rings, wherein first and second drive gears are coupled to the output shaft for rotation therewith, wherein a first driven gear is rotatably coupled to the first ball-ramp ring and is meshing engaged with the first drive gear, and wherein a second driven gear is rotatably coupled to the third ball-ramp ring and is meshingly engaged with the second drive gear.

7. A differential assembly comprising:
    a differential input member that is rotatable about a differential axis and which defines an internal cavity;
    a differential gear set received in the internal cavity, the differential gearset having first and second side gears;
    a first clutch that includes a clutch pack and an apply plate, the clutch pack having a plurality of first clutch plates and a plurality of second clutch plates, the first clutch plates being rotatably coupled to the differential input member, the second clutch plates being interleaved with the first clutch plates and being rotatably coupled to the first side gear, the apply plate being axially slidably but non-rotatably coupled to the first side gear and being disposed against a first axial end of the clutch pack;
    a second clutch that is selectively operable to non-rotatably couple one of the first and second side gears to the differential input member, the second clutch comprising a first dog member, which is non-rotatably coupled to the differential input member, and a second dog member that is axially slidably but non-rotatably coupled to the first side gear;
    a thrust member disposed along the differential axis between the second dog member and the clutch pack; and
    an actuator that is configured to selectively translate the second dog member along the differential axis between a first position, in which the second dog member is disengaged from the first dog member, and a second position in which the first and second dog members are engaged to one another;
    wherein movement of the second dog member from the first position to a position intermediate the first and second positions drives the thrust member into engagement with the apply plate and locates the apply plate at a location where a load is applied to the clutch pack to permit torque transmission through the clutch pack to an extent that is greater than when the second dog member is in the first Position.

8. The differential assembly of claim 7, wherein the actuator is a ball-ramp actuator that is disposed about the differential input member.

9. A differential assembly comprising:
- a differential input member that is rotatable about a differential axis and which defines an internal cavity;
- a differential clear set received in the internal cavity, the differential gearset having first and second side gears;
- a first clutch having a plurality of first clutch plates and a plurality of second clutch plates, the first clutch plates being rotatably coupled to the differential input member, the second clutch plates being interleaved with the first clutch plates and being rotatably coupled to the first side gear;
- a second clutch that is selectively operable to non-rotatably couple one of the first and second side clears to the differential input member, wherein the first and second clutches are axially in-line with one another and operate sequentially;
- a ball-ramp actuator disposed about the differential input member, the ball-ramp actuator having a first output member that is movable along the differential axis to vary a compressive force exerted on the first and second clutch plates and control engagement and disengagement of the second clutch; and
- a spring;
- wherein the second clutch comprises a dog clutch having a first dog member that is rotatably coupled to the differential input, and a second dog member that is disposed axially between the first clutch and the ball-ramp actuator; and
- wherein the first and second clutch plates form a clutch pack, wherein the clutch pack is disposed axially between the spring and the second dog member, and wherein the spring is pre-compressed to a force that exceeds a predetermined threshold force.

* * * * *